United States Patent [19]

Jost

[11] 3,849,868

[45] Nov. 26, 1974

[54] METHOD OF MAKING MAGNESIUM ANODE BATTERY

[75] Inventor: Ernest M. Jost, Plainville, Mass.

[73] Assignee: Texas Instruments Incorporated, Dallas, Tex.

[22] Filed: June 26, 1970

[21] Appl. No.: 59,858

Related U.S. Application Data

[62] Division of Ser. No. 846,733, Aug. 1, 1969, abandoned.

[52] U.S. Cl. ............... 29/480, 29/196.2, 29/197.5, 72/700, 136/100
[51] Int. Cl. .......................................... B23k 31/02
[58] Field of Search ....... 29/480, 197, 197.5, 196.2; 136/100, 107, 108–111, 166; 72/700

[56] References Cited
UNITED STATES PATENTS

| | | | |
|---|---|---|---|
| 2,396,218 | 3/1946 | Watters | 72/700 X |
| 2,616,940 | 11/1952 | Reid | 136/100 |
| 2,697,738 | 12/1954 | Glesner | 136/177 |
| 2,796,456 | 6/1957 | Stokes, Jr. | 136/100 |
| 2,876,137 | 3/1959 | Drummond | 29/196.2 X |
| 2,934,583 | 4/1960 | Stevens | 136/100 |
| 2,935,421 | 5/1960 | Chisholm | 29/196.2 X |
| 3,066,392 | 12/1962 | Kanter et al. | 29/196.2 |
| 3,179,504 | 4/1965 | Bothwell | 29/197.5 |
| 3,360,157 | 12/1967 | Bolt et al. | 220/64 |
| 3,475,140 | 10/1969 | Russell | 29/197.5 X |
| 3,490,124 | 1/1970 | Miller | 29/197.5 X |
| 3,589,873 | 6/1971 | Poth | 29/196.2 X |
| 3,629,092 | 12/1971 | George | 29/196.2 X |

FOREIGN PATENTS OR APPLICATIONS 629,576   10/1961   Canada ............................ 29/480

*Primary Examiner*—John F. Campbell
*Assistant Examiner*—R. J. Shore
*Attorney, Agent, or Firm*—Harold Levine; John A. Haug; James P. McAndrews

[57] ABSTRACT

A battery incorporates a sealed container or can formed of a composite metal laminate material having a layer of magnesium solid-phase metallurgically bonded to other, more easily formed, metal layers of the laminate, the laminate material being deep-drawn to form the battery can with the magnesium layer of the laminate disposed on the interior surface of the can to serve as the battery anode.

1 Claim, 6 Drawing Figures

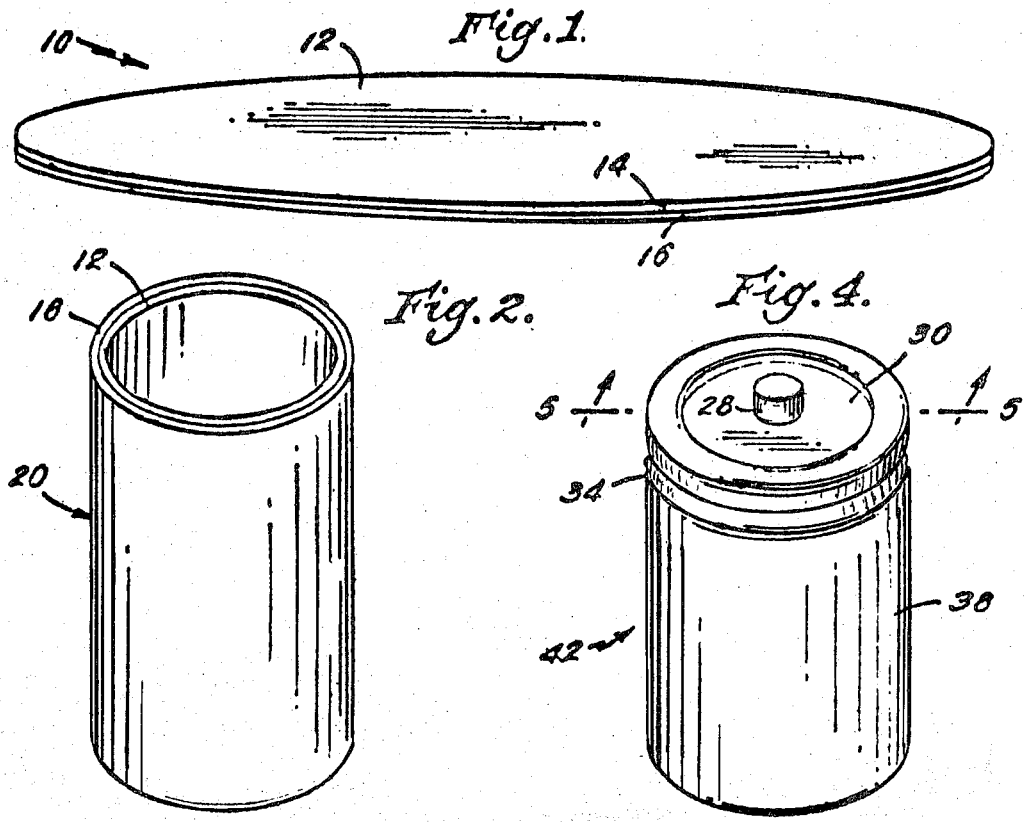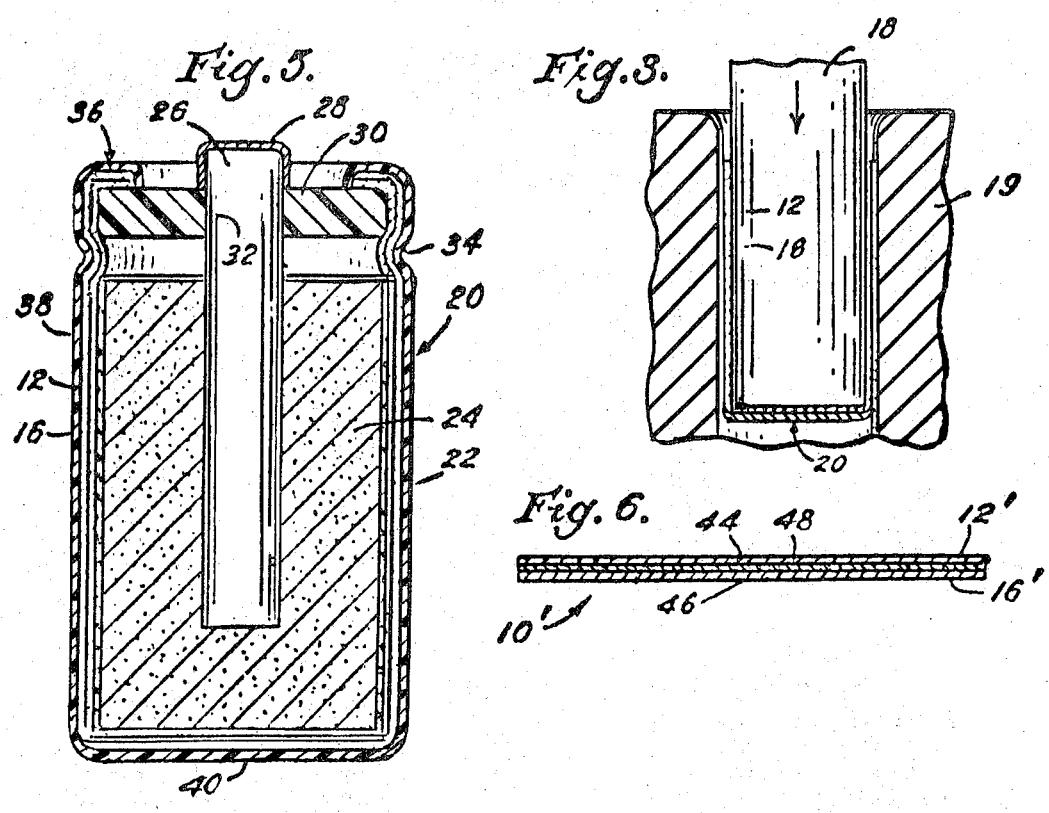

METHOD OF MAKING MAGNESIUM ANODE BATTERY

This application is a division of application Ser. No. 846,733 filed Aug. 1, 1969, and now abandoned.

Primary batteries having cylindrical battery containers or cans formed entirely of magnesium have been known for some time. In such batteries, the magnesium material serves not only as a battery container but also as the battery anode and as the negative terminal of the battery. While this arrangement appears to provide an economical and convenient battery construction, a number of difficulties are experienced in using the magnesium battery cans. For example, because magnesium is very difficult to form by deep-drawing, the containers have usually been made by a hot, die extrusion process, a special extrusion alloy usually being required. This extrusion process conventionally requires use of graphite extrusion members or lubricants, and graphite material tends to become embedded in the magnesium material during the extrusion process. To avoid contamination of the batteries in which such extruded cans are used, this embedded graphite then has to be removed from the extruded containers in special machine operations before the battery containers are filled and sealed. Most important, the magnesium can material is not characterized by high strength and tends to form pinholes, particularly during storage or operation of the batteries incorporating the cans. As a result, the cans are usually formed with much greater thicknesses of the expensive magnesium material than would be required for service of the cans as battery anodes, thereby to provide the cans with suitable strength and to avoid pinholes which extend entirely through the can walls. Further, the magnesium can material is subject to cold flow or relaxation of the material after formation of the can so that battery seals formed between the cans and other battery components by crimping or the like tend to leak after a relatively short period of battery storage or use. Finally, when a battery incorporating such a magnesium can is to be connected in an electrical circuit, it is found that it is very difficult to weld or solder circuit connections to the negative terminal of the battery formed by the magnesium can.

It is an object of this invention to provide a novel and improved magnesium anode battery and a novel and improved method for making such a battery; to provide such a battery which incorporates a battery container formed of a composite metal laminate material having a layer of magnesium solid-phase metallurgically bonded to other metal layers of the laminate, the laminate material being deep-drawn to form a battery can having the magnesium layer of the laminate disposed on the inner surface of the can to serve as a battery anode; to provide such a battery which is free of leaks due to pinholing of the battery can material or due to cold flow of the can material at the locations of battery seals; to provide such a battery which is easily connected in a circuit; and to provide such an improved battery which is of strong, simple and inexpensive construction.

Briefly described, the novel and improved magnesium anode battery of this invention incorporates a hollow cylindrical battery container or can which is opened at one end, the can being formed by deep-drawing of the can configuration from a composite metal laminate material having a layer of magnesium or magnesium alloy solid-phase metallurgically bonded to other metal layers of the laminate material. The laminate material is deep-drawn into the desired can configuration to dispose the magnesium layer of the laminate on the inner surface of the can to serve as the battery anode. The battery can is then lined with a suitable porous, electrically insulating separator material, and the can is filled with finely divided depolarizer material, such as manganese dioxide, and with an electrolyte such as an aqueous alkaline solution. After insertion of a current-collector rod of carbon or the like into the depolarizer-electrolyte mix to serve as the positive terminal of the battery, the top of the battery can is sealed around the end of the carbon rod in a suitable manner.

In this construction, a very thin layer of the expensive magnesium material is disposed on one surface of the composite can material, the thickness of the magnesium layer being sufficient to subsequently serve as the battery anode. The other metal layers of the laminate material are formed of stronger, less expensive and more easily formed materials such as steel or aluminum to provide the composite material with easy formability, improved strength, resistance to pinholing, and resistance to cold metal flow. The outer layer of the laminate material is also preferably selected to facilitate welding or soldering electrical circuit connections to this outer surface of the composite material. The composite material is then deep-drawn to the desired can configuration by conventional deep-drawing procedures. As the magnesium layer of the can material is suitably thin and is metallurgically bonded to more formable laminate layers, the desired can configuration is easily and economically formed without tending to crack or gall the magnesium layer of the laminate. If any pinholes are formed in the magnesium layer of the laminate, the other layers of the laminate material provide the resulting battery can with adequate strength and prevent extension of the pinholes through the can material. The presence of the magnesium material on the inner surface of the can galvanically protects the outer metal layers of the laminate material used in forming the can. After filling of the can with a depolarizer-electrolyte mix and with the current collector rod, or after filling of the can with a bobbin formed of the depolarizer mix pressed onto a collector rod, the open end of the deep-drawn composite material can is easily sealed by crimping the can rim around a cover member, the outer layer of the laminate can material preventing any cold flow of the can material such as would tend to cause leaking at the location of the crimped can rim.

Other objects, advantages and details of the novel and improved battery and methods of battery construction provided by this invention appear in the following more detailed description of preferred embodiments of the invention, the detailed description referring to the drawings in which:

FIG. 1 is a perspective view of a blank suitable for use in forming a battery can in accordance with this invention;

FIG. 2 is a perspective view of a battery can incorporated in the battery of this invention;

FIG. 3 is a section view along line 3—3 of FIG. 2 illustrating a step in the method of this invention;

FIG. 4 is a perspective view of the battery provided by this invention;

FIG. 5 is a section view along line 5—5 of FIG. 4; and

FIG. 6 is a section view along the horizontal axis of a deep-drawing blank similar to the blank of FIG. 1 illustrating features of an alternate embodiment of the battery of this invention.

Referring to the drawings, 10 in FIG. 1 illustrates a circular deep-drawing blank which, in accordance with this invention, is formed from a composite metal laminate material embodying a layer 12 of magnesium material solid-phase metallurgically bonded along the interface 14 to another metal layer 16 of steel or aluminum material or the like. Such a composite material is preferably formed in long strips by known, roll bonding techniques as described in U.S. Pat. No. 2,691,815 or U.S. Pat. No. 2,753,623 or in other conventional manner. The circular blank 10 is then punched or cut from the laminate strip material in any conventional way. Preferably, as will be understood, the composite material embodied in the blank 10 is in an annealed condition.

The magnesium layer of the blank embodies commercially pure magnesium metal or preferably embodies magnesium alloys such as an alloy commonly designated AZ31B consisting essentially of 2.5 – 3.5 percent aluminum, 0.5 – 1.5 percent zinc, 0.2 percent manganese (max.), and the balance magnesium metal. Material compositions as set forth herein are in terms of percent by weight unless otherwise specified. Alternately the magnesium material layer 12 is formed of an alloy consisting essentially of 1.5 percent aluminum (max.), 0.1–0.7 percent zinc, 0.05–0.5 percent calcium, 0.005 percent iron (max.), 0.002 percent nickel (max.), 0.01–0.20 percent manganese, and the balance magnesium. These magnesium materials are commercially available from Dow Chemical Company of Midland, Mich. Other suitable magnesium materials (alloys embodying magnesium as a major constituent thereof) can also be used withing the scope of this invention.

The layer 16 of the deep-drawing blank material is preferably formed of steel such as the capped steel comprising 0.08 percent carbon (max.), 0.25–0.45 percent manganese, 0.040 percent phosphorous (max.), 0.050 percent silicon (max.), and the balance iron, which steel material is commercially available under the ASTM designation 1006 Steel. Alternately, the layer 16 of the deep-drawing blank material is formed of an aluminum material (a metal or alloy embodying aluminum as a major constituent thereof) such as commercially pure aluminum metal. The layer 16 may also embody an aluminum alloy consisting essentially of 0.40 percent silicon (max.), 0.50 percent iron (max.), 0.10 percent copper (max.), 0.20–0.70 percent manganese, 3.5–4.5 percent magnesium, 0.05–0.25 percent copper, 0.25 percent zinc (max.), 0.15 percent titanium (max.), and the balance aluminum with not more than 0.15 percent of other constituents. Within the scope of this invention, the laminate material layer 16 may also be formed of an aluminum alloy comprising 0.45 percent silicon (max.), 0.10 percent copper (max.), 0.10 percent manganese (max.), 2.2–2.8 percent magnesium, 0.15–0.35 percent chromium, 0.10 percent zinc (max.), and the balance aluminum with no more than 0.15 percent of other constituents. In addition, the layer 16 can also embody an aluminum alloy comprising 1.0–1.5 percent silicon, 0.20 percent copper (max.), 0.05 percent manganese (max.), 0.10 percent zinc (max.), and the balance of aluminum with no more than 0.15 percent of other constituents. These aluminum alloys are commercially available from many sources under the designations 5086 Aluminum, 5052 Aluminum and C22 Aluminum. Alternately, the layer 16 of the blank 10 is formed of any suitable metal which is stronger, and more easily formed, than the magnesium or magnesium alloy layer embodied in the composite material of the blank. Preferably, as is the case with the materials specifically named above, the material of the laminate selected for the layer 16 is adapted to be annealed at a sufficiently low temperature to permit annealing of the blank material without inducing a liquid phase in the magnesium material layer of the blank and without inducing such intermetallic compound formation between the blank layers as would tend to cause delamination of the layers.

In accordance with this invention, the blank 10 is subjected to conventional deep-drawing such as is illustrated in FIG. 3 wherein a die or plunger 18 engages the magnesium layer of the blank and moves the blank into a can-forming die 19 for deep-drawing the blank into the configuration of a hollow cylindrical can which is open at one end as illustrated in FIG. 2. As will be understood, where the blank materials are adapted to be annealed without inducing a liquid phase in the magnesium material of the blank and without inducing excessive intermetallic compound formation, the described deep-drawing is preferably performed in several steps separated by annealing steps in which work-hardening induced in the blank material during the preceeding drawing step is substantially removed from the material in a conventional manner. Preferably, the container is not annealed after the final drawing step, thereby to leave the can material in work-hardened condition for providing the can with greater strength. As illustrated, the deep-drawing of the blank disposes the magnesium layer of the composite blank material on the inner surface of the can 20.

In accordance with this invention, the container or can 20 is then lined with a porous, dielectric material 22 to serve as an electrically insulating battery separator. For example, the separator 22 is preferably formed of paper or the like but may also be formed of fabric, flour paste, or other suitable porous, dielectric material which is inert with respect to the electrolyte to be subsequently introduced into the can 20.

In accordance with this invention, as illustrated in FIGS. 4 and 5, the lined can 20 is then substantially filled with a depolarizer material 24 such as a finely divided manganese dioxide powder moistened with a suitable electrolyte such as an aqueous solution of an alkali metal, alkaline earth, or ammonium bromide. If desired, finely divided carbon material such as a acetylene black may also be added to the depolarizer material. Preferably also, a water-insoluble barium, lead or zinc chromate may be mixed with the depolarizer material to increase the capacity of the resulting battery. Any other conventional depolarizer material useful with the magnesium anode can also be introduced into the container 10 within the scope of this invention. In this regard, where some conventional depolarizer materials are used, the use of the separator material 22 may be omitted in conventional manner.

A current collector rod 26 of carbon, graphite or the like is then inserted into the depolarizer. Preferably for example, the collector rod is formed of carbon and is provided with a brass cap 28 press fitted onto the rod end so that the rod is readily adapted to serve as the positive electrode or cathode of the resulting battery, the rod with its cap extending above the level of the depolarizer mix as inserted in the can 20 as illustrated in FIGS. 4 and 5. In a preferred assembly method, the depolarizer moistened with electrolyte and the collector rod are introduced into the lined can 20 in the form of a bobbin consisting of the moistened depolarizer material pressed onto the collector rod in a well known manner.

In accordance with this invention, a sealing and electrically insulating cover member 30 of elastomeric material such as natural rubber or neoprene is then introduced into the open end of the container or can 20, the cover having an aperture 32 fitted around the collector rod 26. The can 20 is then crimped as indicated at 34 to form a shoulder extending around the can periphery and is crimped again as indicated at 36 to compress the elastomeric cover against the shoulder 34 for sealing the cover against the can rim, this crimping further serving to compress the cover material around the collector rod 26 for sealing the cover to the collector rod, thereby to complete sealing of the resulting battery. Preferably, as illustrated at 38 in FIG. 5, the can 20 is covered with an electrically insulating coating of an organic material, lacquer or the like while leaving the bottom of the can exposed as illustrated at 40.

In this construction, the resulting battery 42 incorporates a container or can 20 of substantial strength which is free of pinholes and which is readily sealed to an elastomeric member or the like by crimping without tendency of the can material to display cold flow of the can material such as would tend to cause leaking of the battery at the location of the can crimping. The battery is readily adapted to be fitted into a metal flashlight tube or the like since the coating 38 will electrically insulate the battery can, and therefore the negative terminal of the battery, from the flashlight body. However, the bottom of the battery is exposed so that the bottom of the can conveniently serves as the negative terminal of the battery to facilitate making of electrical connection to the battery. The inner layer 12 of the can material is formed of magnesium to serve as the battery anode and, as the magnesium layer of the can is metallurgically bonded to the other layers of the can material, the battery anode is provided with excellent electrical connection to the outer layer of the can material to which electrical circuit connections can be readily made. In this regard, note that the outer surface of the battery can embodies steel or aluminum or the like to facilitate the soldering or welding of electrical connections to the negative terminal of the battery. Most important, the battery incorporates only a thin layer of the expensive magnesium anode material, the layer thickness being just sufficient to match the charge storing capacity of the depolarizer material utilized in the battery so that, particularly where the can is economically manufactured by the deep-drawing technique described above, the cost of the battery is kept very low. As the magnesium layer of the laminate material is at the anodic end of the galvanic series of metals and alloys, any galvanic action occurring between the laminate layers (due to pinholes and the like in the magnesium layer which expose several of the laminate layers to the battery electrolyte), the magnesium layer of the laminate material will corrode in preference to the other layers of the laminated can material, thereby assuring that no pinhole leaks can be formed in the battery container.

Although a particular battery seal arrangement has been described, it should be understood that, when the battery incorporates the deep-drawn composite metal container above described, any conventional battery sealing means can be employed within the scope of this invention. For example, if desired, the cover 30 and the can crimpings 32 and 34 may be omitted. The battery may then be economically sealed by placing a paper spacer or the like (not shown) on top of the fill of depolarizer material placed in the battery container, the open end of the can then being filled on top of the spacer with hot pitch or the like which is permitted to cool and solidify for sealing the open end of the battery container.

Further, although the battery container above described is shown to embody a two-layer composite metal material, the container material is also formed of three or more layers within the scope of this invention. For example, as illustrated in FIG. 6, a preferred battery is formed in the manner above described utilizing a three-layer, deep-drawn blank 10'. This blank embodies an outer layer 12' of magnesium material, an opposite outer layer 16' of relatively stronger and more easily formed material such as steel, and an intermediate layer 44 formed of aluminum or the like to reduce any tendency to form magnesium-iron intermetallic compounds and to facilitate annealing of the blank material before and during deep-drawing of the blank to form the desired battery can configuration. Preferably, for example, the intermediate layer 44 embodies the aluminum alloy designated above as C22 alloy, which is solid-phase metallurgically bonded at interfaces 46 and 48 to a layer 16' formed of 1006 Steel and a layer 12 of the magnesium material whose composition is first set forth above.

Although particular embodiments of the battery and methods of this invention have been described by way of illustration, it should be understood that this invention includes all modifications and equivalents thereof which fall within the scope of the appended claims.

I claim:

1. A method for making a magnesium battery anode in the form of a battery container comprising the steps of providing a composite metal laminate material blank wherein said composite metal laminate material is selected from the group consisting of a laminate having a layer of steel solid-phase metallurgically bonded to a layer of magnesium material, a laminate having a layer of aluminum material solid-phase metallurgically bonded to a layer of magnesium material, and a laminate having a layer of aluminum material solid-phase metallurgically bonded on one face to a layer of steel and on an opposite face to a layer of magnesium material, said layer of aluminum in each of said composite materials being selected from the group consisting of commercially pure aluminum metal, an alloy consisting of 0.40 percent silicon (max.), 0.50 percent iron (max.), 0.10 percent copper (max.), 0.20–0.70 percent manganese, 3.5–4.5 percent magnesium, 0.05–0.25 percent copper, 0.25 percent zinc (max.), 0.15 percent titanium (max.), and the balance aluminum with not more than 0.15 percent of other constituents, an alloy consisting of 0.45 percent silicon (max.), 0.10 percent copper (max.), 0.10 percent manganese (max.), 2.2–2.8 percent magnesium, 0.15–0.35 percent chromium, 0.10 percent zinc (max.), and the balance aluminum with no more than 0.15 percent of other constituents, and an alloy consisting of 1.0–1.5 percent silicon, 0.20 percent copper (max.), 0.05 percent manganese (max.), 0.10 percent zinc (max.), and the balance aluminum with no more than 0.15 percent of other constituents, and said layers of magnesium material being selected from the group consisting of commercially pure magnesium metal, an alloy consisting of 2.5–3.5 percent aluminum, 0.5–1.5 percent zinc, 0.2 percent manganese (max.), and the balance magnesium metal, and an alloy consisting of 1.5 percent aluminum (max.), 0.1–0.7 percent zinc, 0.05–0.5 percent calcium, 0.005 percent iron (max.) 0.002 percent nickel (max.), 0.01–0.20 percent manganese, and the balance magnesium, and deep drawing said blank to form a hollow tubular metal battery container having an open end and a closed end and having said magnesium metal anode material layer disposed on the inner surface of said container.

* * * * *